United States Patent
Ding et al.

(10) Patent No.: US 10,719,169 B2
(45) Date of Patent: Jul. 21, 2020

(54) TOUCH READOUT CIRCUIT, TOUCH DISPLAY PANEL AND DISPLAY DEVICE

(71) Applicant: BOE TECHNOLOGY GROUP CO., LTD., Beijing (CN)

(72) Inventors: Xiaoliang Ding, Beijing (CN); Haisheng Wang, Beijing (CN); Chun Wei Wu, Beijing (CN); Yingming Liu, Beijing (CN); Shengji Yang, Beijing (CN); Pengcheng Lu, Beijing (CN); Pengpeng Wang, Beijing (CN); Xueyou Cao, Beijing (CN); Wei Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 16/094,658

(22) PCT Filed: Mar. 22, 2018

(86) PCT No.: PCT/CN2018/080002
§ 371 (c)(1),
(2) Date: Oct. 18, 2018

(87) PCT Pub. No.: WO2018/223749
PCT Pub. Date: Dec. 13, 2018

(65) Prior Publication Data
US 2019/0354232 A1    Nov. 21, 2019

(30) Foreign Application Priority Data
Jun. 8, 2017    (CN) .......................... 2017 1 0428401

(51) Int. Cl.
G06F 3/041    (2006.01)
G06F 3/044    (2006.01)

(52) U.S. Cl.
CPC ............ G06F 3/0418 (2013.01); G06F 3/044 (2013.01); G06F 3/0412 (2013.01)

(58) Field of Classification Search
CPC ............................................... G06F 3/041–043
See application file for complete search history.

(56) References Cited

U.S. PATENT DOCUMENTS

| 2011/0267312 A1* | 11/2011 | Lin | ......................... G06F 3/044 345/174 |
| 2013/0063395 A1 | 3/2013 | Byun et al. | |

(Continued)

FOREIGN PATENT DOCUMENTS

| CN | 102999210 A | 3/2013 |
| CN | 103823598 A | 5/2014 |

(Continued)

OTHER PUBLICATIONS

International Search Report and Written Opinion dated Jun. 22, 2018.

*Primary Examiner* — Roy P Rabindranath
(74) *Attorney, Agent, or Firm* — Dilworth & Barrese, LLP.; Michael J. Musella, Esq.

(57) ABSTRACT

A touch readout circuit, a touch display panel and a display device are disclosed, the touch readout circuit includes a first gating circuit, configured to control a first current signal at a first electrode of the light-emitting component; a current mirror circuit, configured to provide the first current signal and a second current signal to a signal processing circuit, a current direction of the second current signal being opposite to a current direction of the first current signal; and a signal processing circuit, configured to: receive the first current signal, the second current signal and a touch scan signal, filter the second current signal to obtain a third current signal, provide a touch readout signal to an output end of the (Continued)

touch readout circuit according to the third current signal, the first current signal and the touch scan signal.

18 Claims, 3 Drawing Sheets

(56) References Cited

U.S. PATENT DOCUMENTS

| | | | | |
|---|---|---|---|---|
| 2014/0306923 | A1* | 10/2014 | Brillant | G06F 3/044 345/174 |
| 2015/0084916 | A1* | 3/2015 | Han | G06F 3/044 345/174 |
| 2017/0123551 | A1 | 5/2017 | Li et al. | |

FOREIGN PATENT DOCUMENTS

| | | |
|---|---|---|
| CN | 104571734 A | 4/2015 |
| CN | 106990873 A | 7/2017 |

\* cited by examiner

TOUCH READOUT CIRCUIT, TOUCH DISPLAY PANEL AND DISPLAY DEVICE

The present application claims priority of the Chinese Patent Application No. 201710428401.0, filed on Jun. 8, 2017, the disclosure of which is incorporated herein by reference in its entirety as part of the present application.

TECHNICAL FIELD

The embodiments of the present disclosure relate to a touch readout circuit, a touch display panel and a display device.

BACKGROUND

Organic light emitting diode (OLED) displays are hotspots in the research field of flat panel displays nowadays. Compared with liquid crystal displays (LCDs), OLED displays have advantages such as low energy consumption, low production cost, self-illumination, wide viewing angle, fast response speed, and the like. Currently, in display fields of mobile phones, digital cameras and the like, OLED displays have begun to replace traditional LCD displays. However, unlike the LCD displays that use stable voltages to control brightness, the OLED displays are driven by electric currents, and need to be controlled to emit light by stable currents.

At present, in an OLED display, the cathode layer of an OLED is multiplexed as a touch electrode, so as to perform self-capacitance touch detection, as shown in FIG. 1, in a display stage, a driving transistor DT0 and a light-emitting control transistor T1 are turned on, so that a light-emitting component EL emits light; and in a touch stage, the light-emitting control transistor T1 needs to be turned off, to perform touch detection. However, because the light-emitting control transistor T1 has a leakage current in a turn-off state, the leakage current causes noise interference to touch signals on the touch electrode, thus affecting the accuracy of the touch detection.

SUMMARY

An embodiment of the present disclosure provides a touch readout circuit, a touch display panel and a display device.

At least one embodiment of the present disclosure provides a touch readout circuit, the touch readout circuit is applied to a touch display panel, and the touch readout circuit is connected to a first electrode of a light-emitting component in the touch display panel; and the touch readout circuit comprises a first gating circuit, a current mirror circuit, and a signal processing circuit; the first gating circuit is configured under control of a first gating signal to control a first current signal at the first electrode of the light-emitting component to flow to the current mirror circuit; the current mirror circuit is configured to: provide the first current signal received to the signal processing circuit, and provide a second current signal to the signal processing circuit, where a current direction of the second current signal is opposite to a current direction of the first current signal; and the signal processing circuit is configured to: receive the first current signal, the second current signal and a touch scan signal, perform filtering processing on the second current signal to obtain a third current signal, provide a touch readout signal to an output end of the touch readout circuit according to the third current signal, the first current signal and the touch scan signal.

For example, the touch readout circuit provided by an embodiment of the present disclosure further comprises a second gating circuit, and the second gating circuit is configured to provide a power voltage to the light-emitting component under control of a second gating signal.

For example, in the touch readout circuit provided by an embodiment of the present disclosure, a control end of the second gating circuit is connected to a second gating control terminal to receive the second gating signal, an input end of the second gating circuit is connected to a first power voltage terminal to receive the power voltage, and an output end of the second gating circuit is connected to the first electrode of the light-emitting component.

For example, in the touch readout circuit provided by an embodiment of the present disclosure, a control end of the first gating circuit is connected to a first gating control terminal to receive the first gating signal, an input end of the first gating circuit is connected to the first electrode of the light-emitting component, and an output end of the first gating circuit is connected to the current mirror circuit; a first input end of the current mirror circuit is connected to a second power voltage terminal, a second input end of the current mirror circuit is connected to the output end of the first gating circuit, and a first output end and a second output end of the current mirror circuit are both connected to the signal processing circuit; a first input end of the signal processing circuit is connected to the second output end of the current mirror circuit, a second input end of the signal processing circuit is connected to the first output end of the current mirror circuit, and a third input end of the signal processing circuit is connected to a touch scan terminal to receive the touch scan signal.

For example, in the touch readout circuit provided by an embodiment of the present disclosure, the current mirror circuit is configured to: provide the first current signal to the second input end of the signal processing circuit through the first output end of the current mirror circuit, and provide the second current signal to the first input end of the signal processing circuit through the second output end of the current mirror circuit.

For example, in the touch readout circuit provided by an embodiment of the present disclosure, the signal processing circuit comprises: a filter sub-circuit, a compensation sub-circuit, and an acquisition sub-circuit, the filter sub-circuit is configured to perform filter processing on the second current signal to generate the third current signal, and provide the third current signal to the compensation sub-circuit; the compensation sub-circuit is configured to convert the third current signal into a first voltage signal and provide the first voltage signal to the acquisition sub-circuit; and the acquisition sub-circuit is configured to: convert a superimposed signal of the touch scan signal and the first current signal into a second voltage signal, generate the touch readout signal according to the second voltage signal and the first voltage signal, and provide the touch readout signal to the output end of the touch readout circuit.

For example, in the touch readout circuit provided by an embodiment of the present disclosure, the filter sub-circuit is connected to the second output end of the current mirror circuit and an input end of the compensation sub-circuit, an output end of the compensation sub-circuit is connected to a first input end of the acquisition sub-circuit, a second input end of the acquisition sub-circuit is connected to the first output end of the current mirror circuit, a third input end of the acquisition sub-circuit is connected to the touch scan terminal, and an output end of the acquisition sub-circuit is connected to the output end of the touch readout circuit.

For example, in the touch readout circuit provided by an embodiment of the present disclosure, the filter sub-circuit comprises a first capacitor, a first end of the first capacitor is connected to the second output end of the current mirror circuit and the input end of the compensation sub-circuit, and a second end of the first capacitor is grounded.

For example, in the touch readout circuit provided by an embodiment of the present disclosure, the compensation sub-circuit comprises: a first amplifier and a second capacitor, an inverting input end of the first amplifier is connected to the input end of the compensation sub-circuit, a non-inverting input end of the first amplifier is grounded, an output end of the first amplifier is connected to the first input end of the acquisition sub-circuit; and the second capacitor is connected between the inverting input end of the first amplifier and the output end of the first amplifier.

For example, in the touch readout circuit provided by an embodiment of the present disclosure, the acquisition sub-circuit comprises a second amplifier, a third capacitor and an adder, a non-inverting input end of the second amplifier is connected to an output end of the adder, an inverting input end of the second amplifier is connected to the first output end of the current mirror circuit, and an output end of the second amplifier is connected to the output end of the touch readout circuit; the third capacitor is connected between the inverting input end of the second amplifier and the output end of the second amplifier; a first input end of the adder is connected to the output end of the compensation sub-circuit, a second input end of the adder is connected to the touch scan terminal, and the adder is configured to provide a signal obtained by superimposing the first voltage signal and the touch scan signal to the non-inverting input end of the second amplifier.

For example, in the touch readout circuit provided by an embodiment of the present disclosure, the first gating circuit comprises a first switch transistor, a gate electrode of the first switch transistor is connected to the first gating control terminal, a first electrode of the first switch transistor is connected to the first electrode of the light-emitting component, and a second electrode of the first switch transistor is connected to the second input end of the current mirror circuit.

For example, in the touch readout circuit provided by an embodiment of the present disclosure, the second gating circuit comprises a second switch transistor, a gate electrode of the second switch transistor is connected to the second gating control terminal, a first electrode of the second switch transistor is connected to the first power voltage terminal, and a second electrode of the second switch transistor is connected to the first electrode of the light-emitting component.

For example, in the touch readout circuit provided by an embodiment of the present disclosure, the current mirror circuit comprises a third switch transistor and a fourth switch transistor, a first electrode of the third switch transistor is connected to a gate electrode of the third switch transistor and the output end of the first gating circuit respectively, and a second electrode of the third switch transistor is connected to the second input end of the signal processing circuit; a gate electrode of the fourth switch transistor is connected to the gate electrode of the third switch transistor, a first electrode of the fourth switch transistor is connected to the second power voltage terminal, and a second electrode of the fourth switch transistor is connected to the first input end of the signal processing circuit.

An embodiment of the present disclosure further provides a touch display panel, comprising a light-emitting component and the touch readout circuit provided by any one of the above embodiments of the present disclosure, a first electrode of the light-emitting component is connected to the touch readout circuit.

For example, in the touch display panel provided by an embodiment of the present disclosure, the first electrode of the light-emitting component is multiplexed as a touch electrode.

For example, the touch display panel provided by an embodiment of the present disclosure further comprises a drive circuit, and the drive circuit is configured to drive the light-emitting component to emit light.

For example, in the touch display panel provided by an embodiment of the present disclosure, the drive circuit comprises a data writing transistor, a driving transistor, a light-emitting control transistor and a storage capacitor, the driving transistor is configured to drive the light-emitting component to emit light; the data writing transistor is configured to write a data voltage to a gate electrode of the driving transistor when the data writing transistor is turned on; the storage capacitor is configured to store the data voltage and maintain the data voltage at the gate electrode of the driving transistor; and the light-emitting control transistor is configured to control connection or disconnection between the driving transistor and the light-emitting component.

An embodiment of the present disclosure further provides a display device, comprising the touch display panel provided by any one of the above embodiments of the present disclosure.

Therefore, in the above touch readout circuit provided by the embodiments of the present disclosure, through the mutual cooperation among the above four circuits, that is, transmitting currents, that have opposite directions and are equal with each other, to two input ends of the signal processing circuit respectively through the current mirror circuit, the signal processing circuit performs filter processing on a current signal received by the first input end of the signal processing circuit, and only the direct current signal, that is a noise signal, formed by a leakage current is retained; the current signal received by the second input end of the signal processing circuit includes a touch signal and the noise signal, the signal processing circuit can eliminate the noise signal by processing the current signals received by the first input end and the second input end of the signal processing circuit, so as to achieve outputting the touch readout signal only related to the touch signal, avoid an influence of the noise signal on the touch readout signal, and improve the accuracy of touch detection.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The specific implementations of the touch readout circuit, the touch display pane and the display device provided by the embodiments of the present disclosure are described in detail below in conjunction with the accompanying drawings.

Figure 1:
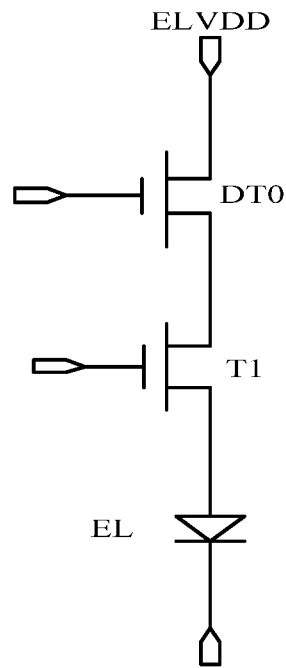
FIG. 1 is a schematic structural view of a drive circuit of a display.
Figure 2:
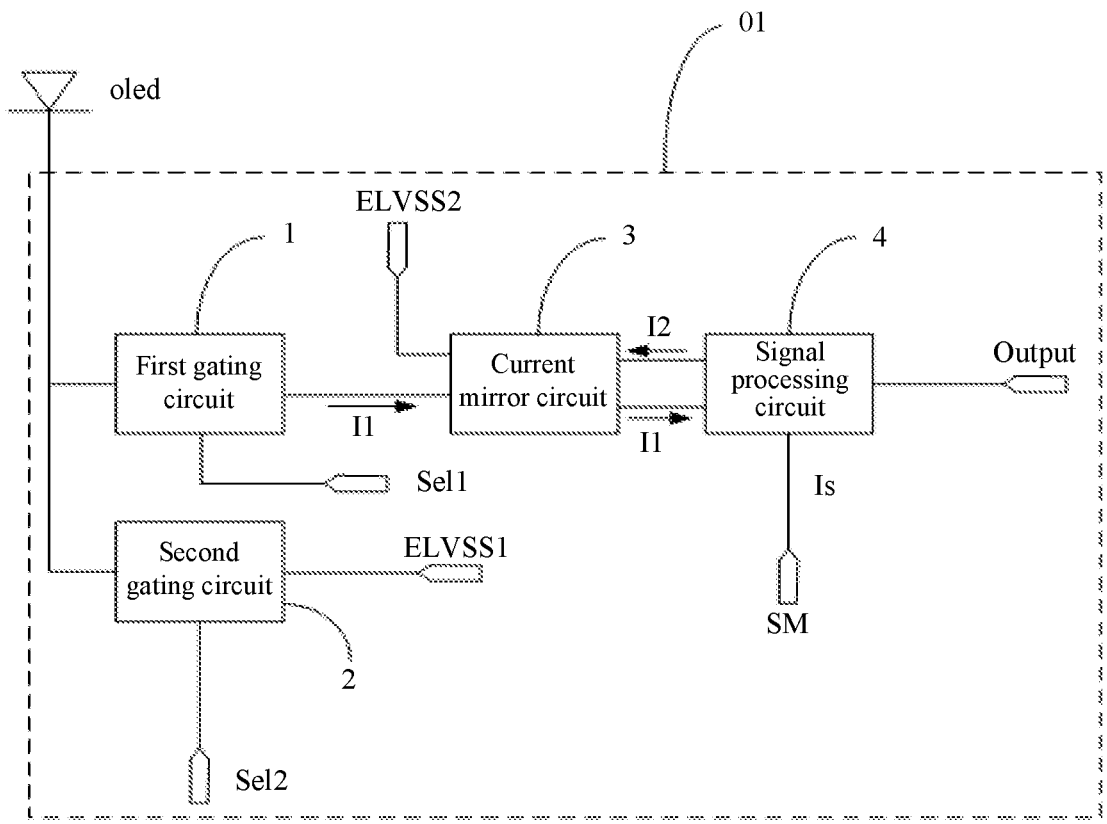
FIG. 2 is a first schematic structural view of a touch readout circuit provided by an embodiment of the present disclosure.

FIG. 2 is a first schematic structural view of a touch readout circuit provided by an embodiment of the present disclosure.

A touch readout circuit provided by the embodiment of the present disclosure can be applied to a touch display panel. As shown in FIG. 2, the touch readout circuit 01 comprises a first gating circuit 1, a second gating circuit 2, a current mirror circuit 3 and a signal processing circuit 4. The touch readout circuit 01 can be connected to a first electrode of a light-emitting component oled in the touch display panel.

For example, a control end of the first gating circuit 1 is connected to a first gating control terminal sel1 to receive a first gating signal, an input end of the first gating circuit 1 is connected to the first electrode of the light-emitting component oled, and an output end of the first gating circuit 1 is connected to the current mirror circuit 3. The first gating circuit 1 is configured to control a first current signal I1 at the first electrode of the light-emitting component oled to flow to the current mirror circuit 3 under control of the first gating signal.

For example, a control end of the second gating circuit 2 is connected to a second gating control terminal sel2 to receive a second gating signal, an input end of the second gating circuit 2 is connected to a first power voltage terminal ELVSS1 to receive a power voltage, and an output end of the second gating circuit 2 is connected to the first electrode of the light-emitting component oled. The second gating circuit 2 is configured to provide the power voltage of the first power voltage terminal ELVSS1 to the light-emitting component oled under control of a second gating signal.

For example, the light-emitting component oled may be a light-emitting diode such as an organic light-emitting diode.

For example, a first input end of the current mirror circuit 3 is connected to a second power voltage terminal ELVSS2, a second input end of the current mirror circuit 3 is connected to the output end of the first gating circuit 1, and a first output end and a second output end of the current mirror circuit 3 are both connected to signal processing circuit 4. The current mirror circuit 3 is configured to: provide the received first current signal I1 to the signal processing circuit 4, and provide a second current signal I2 to the signal processing circuit 4, for example, the current direction of the second current signal I2 is opposite to the current direction of the first current signal I1.

For example, the first power voltage terminal ELVSS1 and the second power voltage terminal ELVSS2 may be both grounded. Alternatively, the first power voltage terminal ELVSS1 and the second power voltage terminal ELVSS2 may be the same power voltage terminal, that is, the input end of the second gating circuit 2 and the first input end of the current mirror circuit 3 are connected to the same power voltage terminal.

For example, a first input end of the signal processing circuit 4 is connected to the second output end of the current mirror circuit 3, a second input end of the signal processing circuit 4 is connected to the first output end of the current mirror circuit 3, and a third input end of the signal processing circuit 4 is connected to a touch scan terminal SM to receive the touch scan signal Is. The signal processing circuit 4 is configured to: receive the first current signal I1, the second current signal I2 and the touch scan signal Is, perform a filtering processing on the second current signal I2 to obtain a third current signal, and provide a touch readout signal to an output end Output of the touch readout circuit 01 according to the third current signal after the filtering processing, the first current signal I1 and the touch scan signal Is.

In the touch readout circuit provided by the embodiment of the present disclosure, through mutual cooperation among the above four circuits, that is, transmitting currents, which have opposite directions and are equal with each other, to two input ends of the signal processing circuit respectively through the current mirror circuit, the signal processing circuit performs a filter processing on the current signal received by the first input end of the signal processing circuit, and only the direct current signal, that is a noise signal, formed by a leakage current is retained; the current signal received by the second input end of the signal processing circuit includes a touch signal and the noise signal, the signal processing circuit can eliminate the noise signal by processing the current signals received by the first input end and the second input end of the signal processing circuit, so as to achieve outputting of the touch readout signal only related to the touch signal, and avoid the influence of the noise signal on the touch readout signal, and improve the accuracy of touch detection.

For example, the current mirror circuit 3 is configured to: provide the first current signal I1 to the second input end of the signal processing circuit 4 through the first output end of the current mirror circuit 3, and provide the second current signal I2 to the first input end of the signal processing circuit 4 through the second output end of the current mirror circuit 3.

For example, the first electrode of the light-emitting component oled may be a cathode of the light-emitting component oled.

Figure 3:
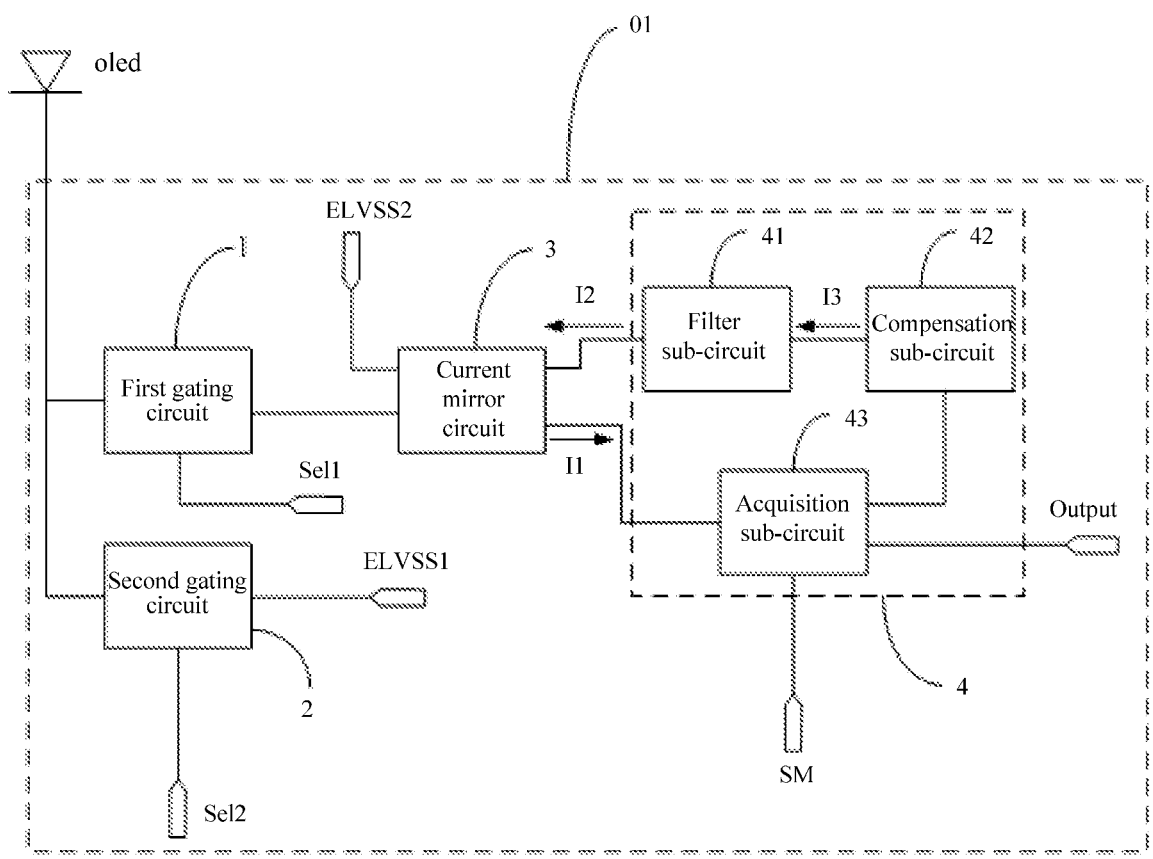
FIG. 3 is a second schematic structural view of a touch readout circuit provided by an embodiment of the present disclosure.

FIG. 3 is a second schematic structural view of a touch readout circuit provided by an embodiment of the present disclosure.

For example, in the above touch readout circuit provided by the embodiment of the present disclosure, as shown in FIG. 3, the signal processing circuit 4 comprises: a filter sub-circuit 41, a compensation sub-circuit 42, and an acquisition sub-circuit 43.

For example, the filter sub-circuit 41 is connected to the second output end of the current mirror circuit 3 and an input end of the compensation sub-circuit 42, and the filter sub-circuit 41 is configured to perform a filter processing on the second current signal I2 to generate the third current signal I3 and provide the third current signal I3 to the compensation sub-circuit 42.

For example, an output end of the compensation sub-circuit 42 is connected to a first input end of the acquisition sub-circuit 43. The compensation sub-circuit 42 is configured to convert the third current signal I3 into a first voltage signal and provide the first voltage signal to the acquisition sub-circuit 43.

For example, a second input end of the acquisition sub-circuit 43 is connected to the first output end of the current mirror circuit 3, a third input end of the acquisition sub-circuit 43 is connected to the touch scan terminal SM, and an output end of the acquisition sub-circuit 43 is connected to the output end Output of the touch readout circuit 01. The acquisition sub-circuit 43 is configured to: convert the superimposed signal of the touch scan signal and the first current signal into a second voltage signal, generate a touch readout signal according to the second voltage signal and the first voltage signal, and provide the touch readout signal to the output end Output of the touch readout circuit 01.

The present disclosure is described in detail below in conjunction with the specific embodiments. It should be noted that the present embodiments are intended to better explain the present disclosure, but not to limit the present disclosure.

Figure 4:
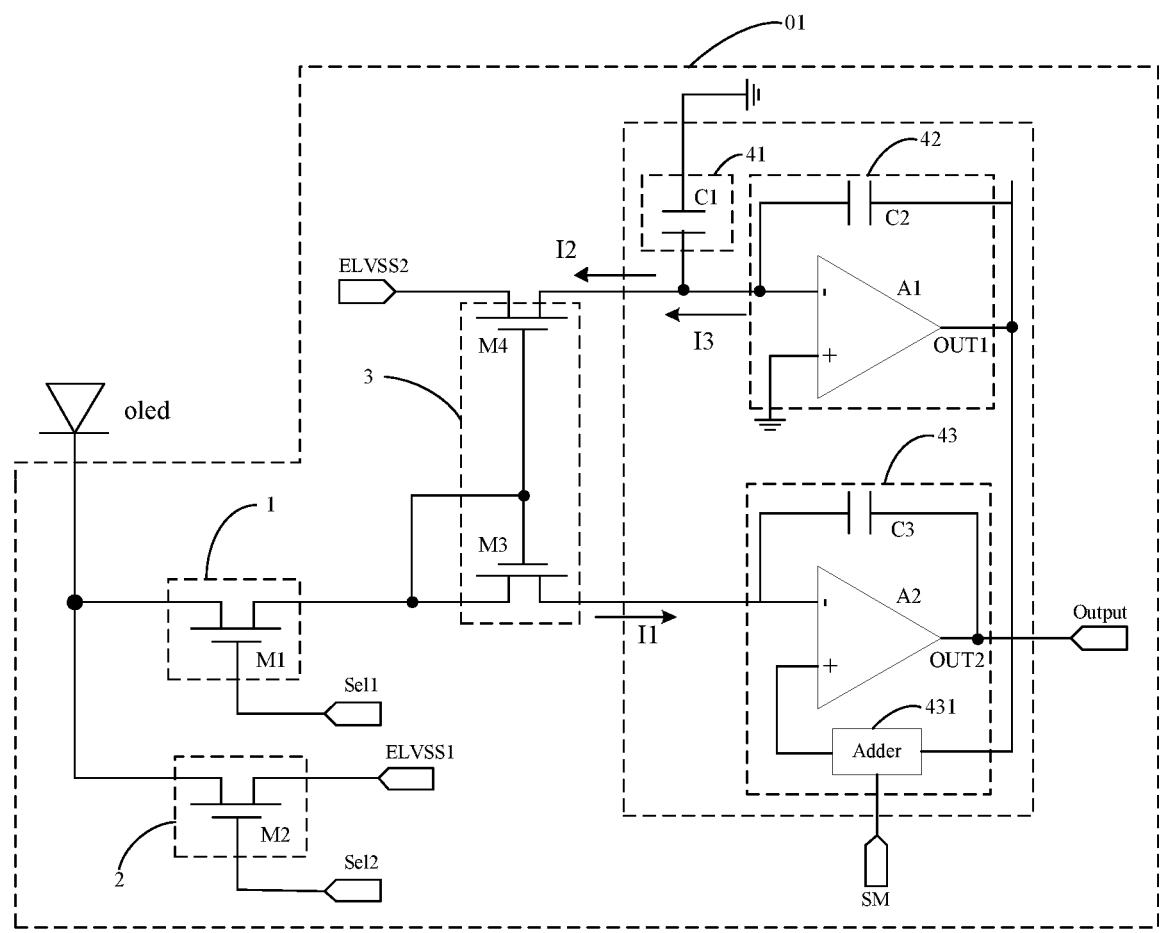
FIG. 4 is a third schematic structural view of a touch readout circuit provided by an embodiment of the present disclosure.

FIG. 4 is a third schematic structural view of a touch readout circuit provided by an embodiment of the present disclosure.

For example, in the above touch readout circuit provided by the embodiment of the present disclosure, as shown in FIG. 4, the filter sub-circuit 41 comprises a first capacitor C1. A first end of the first capacitor C1 is connected to the second output end of the current mirror circuit 3 and the input end of the compensation sub-circuit 42, and a second end of the first capacitor C1 is grounded.

What have been described above are merely an example to illustrate the specific structure of the filter sub-circuit in the touch readout circuit, in a specific implementation, the specific structure of the filter sub-circuit is not limited to the above-mentioned structure provided by the embodiment of the present disclosure, and may be other structures known to those skilled in the art, and the present disclosure is not limited thereto.

For example, in the above touch readout circuit provided by the embodiment of the present disclosure, as shown in FIG. 4, the compensation sub-circuit 42 comprises: a first amplifier A1 and a second capacitor C2. An inverting input end "−" of the first amplifier A1 is connected to the input end of the compensation sub-circuit 42, a non-inverting input end "+" of the first amplifier A1 is grounded, an output end OUT1 of the first amplifier A1 is connected to the first input end of the acquisition sub-circuit 43; and the second capacitor C2 is connected between the inverting input end "−" of the first amplifier A1 and the output end OUT1 of the first amplifier A1.

What have been described above are merely an example to illustrate a specific structure of the compensation sub-circuit in the touch readout circuit, in a specific implementation, the specific structure of the compensation sub-circuit is not limited to the above-mentioned structure provided by the embodiment of the present disclosure, and may be other structures known to those skilled in the art, and the present disclosure is not limited thereto.

For example, in the above touch readout circuit provided by the embodiment of the present disclosure, as shown in FIG. 4, the acquisition sub-circuit 43 comprises a second amplifier A2, a third capacitor C3 and an adder 431. A non-inverting input end "+" of the second amplifier A2 is connected to an output end of the adder 431, an inverting input end "−" of the second amplifier A2 is connected to the first output end of the current mirror circuit 3, and an output end OUT2 of the second amplifier A2 is connected to the output end Output of the touch readout circuit 01; and the third capacitor C3 is connected between the inverting input end "−" of the second amplifier A2 and the output end OUT2 of the second amplifier A2.

A first input end of the adder 431 is connected to the output end of the compensation sub-circuit 42, a second input end of the adder 431 is connected to the touch scan terminal SM, and the adder 431 is configured to provide a signal that is obtained by superimposing the first voltage signal and the touch scan signal to the non-inverting input end "+" of the second amplifier A2.

What have been described above are merely examples to illustrate a specific structure of the acquisition sub-circuit and a specific structure of the adder in the touch readout circuit, in a specific implementation, the specific structures of the acquisition sub-circuit and the adder are not limited to the above-mentioned structures provided by the embodiment of the present disclosure, and may be other structures known to those skilled in the art, and the present disclosure is not limited thereto.

For example, in the above touch readout circuit provided by the embodiment of the present disclosure, as shown in FIG. 4, the first gating circuit 1 comprises a first switch transistor M1. A gate electrode of the first switch transistor M1 is connected to the first gating control terminal sel1, a first electrode of the first switch transistor M1 is connected to the first electrode of the light-emitting component oled, and a second electrode of the first switch transistor M1 is connected to the second input end of the current mirror circuit 3.

What have been described above are merely an example to illustrate a specific structure of the first gating circuit in the touch readout circuit, in a specific implementation, the specific structure of the first gating circuit is not limited to the above-mentioned structure provided by the embodiment of the present disclosure, and may be other structures known to those skilled in the art, and the present disclosure is not limited thereto.

For example, in the above touch readout circuit provided by the embodiment of the present disclosure, as shown in FIG. 4, the second gating circuit 2 comprises a second switch transistor M2. A gate electrode of the second switch transistor M2 is connected to the second gating control terminal sel2, a first electrode of the second switch transistor M2 is connected to the first power voltage terminal ELVSS1, and a second electrode of the second switch transistor M2 is connected to the first electrode of the light-emitting component oled.

What have been described above are merely an example to illustrate a specific structure of the second gating circuit in the touch readout circuit, in a specific implementation, the specific structure of the second gating circuit is not limited to the above-mentioned structure provided by the embodiment of the present disclosure, and may be other structures known to those skilled in the art, and the present disclosure is not limited thereto.

For example, in the above touch readout circuit provided by the embodiment of the present disclosure, as shown in FIG. 4, the current mirror circuit 3 comprises a third switch transistor M3 and a fourth switch transistor M4. A first electrode of the third switch transistor M3 is connected to a gate electrode of the third switch transistor M3 and the output end of the first gating circuit 1 respectively, and a second electrode of the third switch transistor M3 is connected to the second input end of the signal processing circuit 4, for example, the inverting input end "−" of the second amplifier A2 may be the second input end of the signal processing circuit 4, that is, the second electrode of the third switch transistor M3 is connected to the inverting input end "−" of the second amplifier A2.

For example, a gate electrode of the fourth switch transistor M4 is connected to the gate electrode of the third switch transistor M3, a first electrode of the fourth switch transistor M4 is connected to the second power voltage terminal ELVSS2, and a second electrode of the fourth switch transistor M4 is connected to the first input end of the signal processing circuit 4. For example, the inverting input end "−" of the first amplifier A1 may be the first input end of the signal processing circuit 4, that is, the second electrode of the fourth switch transistor M4 is connected to the inverting input end "−" of the first amplifier A1.

What have been described above are merely an example to illustrate a specific structure of the current mirror circuit in the touch readout circuit, in a specific implementation, the specific structure of the current mirror circuit is not limited to the above-mentioned structure provided by the embodiment of the present disclosure, and may be other structures known to those skilled in the art, and the present disclosure is not limited thereto.

It should be noted that, transistors used in the embodiments of the present disclosure may be thin film transistors, field effect transistors or other switching devices with the like characteristics. A source electrode and a drain electrode of a transistor used herein may be symmetrical in structure, so the source electrode and the drain electrode of the transistor may have no difference in structure. In the embodiments of the present disclosure, in order to distinguish two electrodes of the transistor other than a gate electrode, one of the two electrodes is directly referred to as a first electrode, and the other of the two electrodes is referred to as a second electrode, and therefore the first electrode and the second electrode of all or part of the transistors in the embodiments of the present disclosure are interchangeable as required. For example, in the above embodiment of the present disclosure, the first electrode of the switch transistor may be the source electrode, and the second electrode may be the drain electrode; alternatively, the first electrode of the switch transistor may be the drain electrode, and the second electrode may be the source electrode, and the embodiments of the present disclosure does not specifically distinguish the first electrode and the second electrode here. In addition, the transistors may be classified into N-type transistors and P-type transistors according to the characteristics of the transistors. The embodiments of the present disclosure do not limit the types of the transistors, and a person having ordinary skill in the art can implement the embodiments of the present disclosure by using N-type and/or P-type transistors according to actual needs.

An operation principle of the touch readout circuit provided by the embodiments of the present disclosure is described in detail below by taking the touch readout circuit shown in FIG. 4 as an example.

In a display stage, the first switch transistor M1 is turned off, and the second switch transistor M2 provides the power voltage of the first power voltage terminal ELVSS1 to the light-emitting component oled under the control of the second gating control terminal sel2, the light-emitting component oled normally displays, a display process is the same as an existing display process, and therefore redundant descriptions is omitted here.

In a touch stage, the second switch transistor M2 is turned off, under the control of the first gating signal sel1 the first switch transistor M1 controls the first current signal I1 at the first electrode of the light-emitting component oled to flow to the current mirror circuit 3, in this situation, the second electrode of the third switch transistor M3 outputs the first current signal I1 to the inverting input terminal "−" of the second amplifier A2, the second electrode of the fourth switch transistor M4 outputs the second current signal I2, and the first current signal I1 and the second current signal I2 both comprise a touch signal Itouch and a noise signal Ileak; because the first input end of the current mirror circuit 3 is connected to the second power voltage terminal ELVSS2, the direction of the second current signal I2 is opposite to the direction of the first current signal I1, and the second current signal I2 is equal in magnitude to the first current signal I1, that is, I1=−I2=Ileak+Itouch; the first capacitor C1 filters the second current signal I2 to generate the third current signal I3, and the third current signal I3 can be supplied to the inverting input end "−" of the first amplifier A1, the third current signal I3 includes only the noise signal Ileak, that is, I3=−Ileak; the output end OUT1 of the first amplifier A1 outputs the first voltage signal V1, and the first voltage signal V1=−I3×t1/Cf1=Ileak×t1/Cf1, where t1 is integration time of the first amplifier A1, and Cf1 is a capacitance value of the second capacitor C2.

For example, the first voltage signal V1 is transmitted to the first input end of the adder 431, that is, a signal of the first input end of the adder 431 is the first voltage signal V1, however, the second input end of the adder 431 is connected to the touch scan terminal SM, so a signal of the second input end of the adder 431 is the touch scan signal Vbase. A signal of the output end of the adder 431 is a superimposed signal of the first voltage signal V1 and the touch scan signal Vbase, the adder 431 provides the superimposed signal to the non-inverting input end "+" of the second amplifier A2, namely the voltage signal V2 of the non-inverting input end "+" of the second amplifier A2 is V2=V1+Vbase. The integration voltage signal V3 on the third capacitor C3 is V3=I1×t2/Cf2=(Ileak+Itouch)×t2/Cf2, where t2 is integration time of the second amplifier A2, and Cf2 is the capacitance value of the third capacitor C3. The signal outputted by the output end OUT2 of the second amplifier A2 is V=V2−V3, the signal V outputted by the output end OUT2 of the second amplifier A2 is the touch readout signal outputted by the output end Output of the touch readout circuit 01, if Cf1=Cf2, t1=t2, the touch readout signal V outputted by the output end Output of the touch readout circuit 01 is:

$$V = V2 + V3 = (V1 + Vbase) - (Ileak + Itouch) \times t2 / Cf2$$
$$= (Ileak \times t1 / Cf1 + Vbase) - (Ileak + Itouch) \times t1 / Cf1$$
$$= -Itouch \times t1 / Cf1 + Vbase$$

Namely the touch readout signal V=−Itouch×t1/Cf1+Vbase. The touch position can be determined according to the touch readout signal, because the touch readout signal V=−Itouch× t1/Cf1+Vbase, and the touch readout signal V is related to the touch signal Itouch and the touch scan signal Vbase and is irrelevant to the noise signal Ileak. Therefore, the touch readout circuit provided by the embodiment of the present disclosure avoids the influence of the noise signal caused by the leakage current on the touch readout signal, and improves the accuracy of the touch detection.

Figure 5:
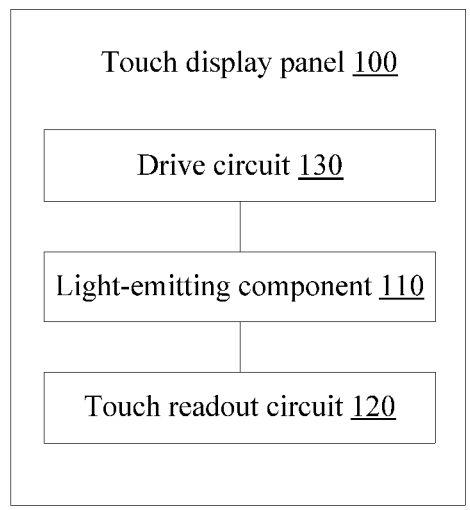
FIG. 5 is a schematic block diagram of a touch display panel provided by an embodiment of the present disclosure.

Based on the same inventive concept, an embodiment of the present disclosure further provides a touch display panel, and FIG. 5 is a schematic block diagram of a touch display panel provided by an embodiment of the present disclosure.

For example, as shown in FIG. 5, the touch display panel 100 provided by the embodiment of the present disclosure may comprise a light-emitting component 110 and any one of the above-described touch readout circuits 120 provided by the embodiments of the present disclosure, a first electrode of the light-emitting component 110 is connected to the touch readout circuit 120.

For example, the first electrode of the light-emitting component 110 is multiplexed or also used as a touch electrode. The first electrode of the light-emitting component 110 is a cathode of the light-emitting component.

It should be noted that the principle of solving the problem by the touch display panel is similar to that of the aforementioned touch readout circuit. Therefore, the specific description of the touch readout circuit in the touch display panel can be referred to the embodiment of the touch readout circuit, and repeated portions are omitted here.

For example, the touch display panel 100 further comprises a drive circuit 130, and the drive circuit 130 is configured to drive the light-emitting component 110 to emit light. The drive circuit 130 can comprise a driving transistor, a data writing transistor, a light-emitting control transistor and a storage capacitor. The driving transistor is configured to drive the light-emitting component 110 to emit light; the data writing transistor is configured to write a data voltage to a gate electrode of the driving transistor when the data writing transistor is turned on; the storage capacitor is configured to store the data voltage and maintain the data voltage at the gate electrode of the driving transistor; and the light-emitting control transistor is configured to control connection or disconnection between the driving transistor and the light-emitting component.

For example, a first electrode of the light-emitting control transistor is connected to a second electrode of the driving transistor, a second electrode of the light-emitting control transistor is connected to a second electrode of the light-emitting component 110, and a gate electrode of the light-emitting control transistor is configured to receive a light-emitting control signal. A second electrode of the driving transistor is connected to a third power voltage terminal, and a gate electrode of the driving transistor is connected to a first electrode of the data writing transistor. A gate electrode of the data writing transistor is configured to receive a light-emitting scan signal, and a second electrode of the data writing transistor is connected to a data line to receive the data voltage. One end of the storage capacitor is connected to the first electrode of the driving transistor, and the other end of the storage capacitor is connected to the gate electrode of the driving transistor. The second electrode of the light-emitting component 110 may be an anode.

For example, the third power voltage terminal may be connected to a positive pole of the power supply.

For example, in the display stage, the light-emitting control transistor is turned on, so that the driving transistor and the light-emitting component 110 are switched on, the driving current flowing through the driving transistor is transmitted to the light-emitting component 110, and the light-emitting component 110 normally displays. In the touch stage, the light-emitting control transistor is turned off, the first electrode of the light-emitting component 110 serves as a touch electrode to implement touch detection. In a touch detection process, the noise signal (the noise signal Ileak in the embodiment of the above touch readout circuit) comprises the leakage current of the light-emitting control transistor in a turn-off state, and the touch readout circuit 120 can compensate the leakage current of the light-emitting control transistor, and eliminate the influence of the leakage current of the light-emitting control transistor on the touch detection.

It should be noted, the embodiments of the present disclosure are described by taking the case where the drive circuit has a 3T1C structure as an example, but the drive circuit of the embodiments of the present disclosure is not limited to the 3T1C structure. For example, according to actual needs, the drive circuit further comprises a transfer transistor, a detection transistor, a reset transistor, and so on.

Based on the same inventive concept, an embodiment of the present disclosure further provides a display device. For example, the display device comprises the touch display panel provided by any one of the embodiments of the present disclosure.

For example, the display device can be a mobile phone, a tablet, a television, a monitor, a notebook computer, a digital photo frame, a navigator, or any products or components having a display function.

Other components of the display device, that are understood by those of ordinary skill in the art, are not be described herein, and should not be construed as limitation upon the present disclosure. The specific description of the touch display panel in the display device can be referred to the embodiment of the touch display panel, and repeated portions will be omitted here.

The embodiments of the present disclosure provide a touch readout circuit, a touch display panel and a display device, the touch readout circuit is applied to the touch display panel, and the touch readout circuit is connected to the first electrode (the cathode) of the light-emitting component in the touch display panel, the touch readout circuit comprises a first gating circuit, a second gating circuit, a current mirror circuit, and a signal processing circuit. In the above touch readout circuit provided by the embodiments of the present disclosure, through the mutual cooperation among the above four circuits, that is, transmitting currents, that have opposite directions and are equal with each other, to two input ends of the signal processing circuit respectively through the current mirror circuit, the signal processing circuit performs filter processing on the current signal received by the first input end of the signal processing circuit, and only the direct current signal, that is a noise signal, formed by a leakage current is retained; the current signal received by the second input end of the signal processing circuit includes a touch signal and the noise signal, the signal processing circuit can eliminate the noise signal by processing the current signals received by the first input end and the second input end of the signal processing circuit, so as to achieve outputting of the touch readout signal only related to the touch signal, avoid an influence of the noise signal on the touch readout signal, and improve the accuracy of touch detection.

Obviously, various changes and modifications can be made by those skilled in the art to the present disclosure, without departing from the spirits and the scope of the present disclosure. Therefore, so far as these changes and modifications fall in the scope of the claims and their equivalents of the present application, the present disclosure shall also intend to cover such changes and modifications.

What is claimed is:

1. A touch readout circuit, applied to a touch display panel and connected to a first electrode of a light-emitting component in the touch display panel, and comprising: a first gating circuit, a current mirror circuit and a signal processing circuit,
    wherein the first gating circuit is configured under control of a first gating signal to control a first current signal at the first electrode of the light-emitting component to flow to the current mirror circuit;
    the current mirror circuit is configured to: provide the first current signal received to the signal processing circuit and provide a second current signal to the signal processing circuit, a current direction of the second current signal is opposite to a current direction of the first current signal; and
    the signal processing circuit is configured to: receive the first current signal, the second current signal and a touch scan signal, perform filtering processing on the second current signal to obtain a third current signal, provide a touch readout signal to an output end of the touch readout circuit according to the third current signal, the first current signal and the touch scan signal.

2. The touch readout circuit according to claim 1, further comprising a second gating circuit,
    wherein the second gating circuit is configured to provide a power voltage to the light-emitting component under control of a second gating signal.

3. The touch readout circuit according to claim 2, wherein a control end of the second gating circuit is connected to a second gating control terminal to receive the second gating signal, an input end of the second gating circuit is connected to a first power voltage terminal to receive the power voltage, and an output end of the second gating circuit is connected to the first electrode of the light-emitting component.

4. The touch readout circuit according to claim 3, wherein the second gating circuit comprises a second switch transistor,
    a gate electrode of the second switch transistor is connected to the second gating control terminal, a first electrode of the second switch transistor is connected to the first power voltage terminal, and a second electrode of the second switch transistor is connected to the first electrode of the light-emitting component.

5. The touch readout circuit according to claim 1, wherein a control end of the first gating circuit is connected to a first gating control terminal to receive the first gating signal, an input end of the first gating circuit is connected to the first electrode of the light-emitting component, and an output end of the first gating circuit is connected to the current mirror circuit;
    a first input end of the current mirror circuit is connected to a second power voltage terminal, a second input end of the current mirror circuit is connected to an output end of the first gating circuit, and a first output end and a second output end of the current mirror circuit are both connected to the signal processing circuit; and
    a first input end of the signal processing circuit is connected to the second output end of the current mirror circuit, a second input end of the signal processing circuit is connected to the first output end of the current mirror circuit, and a third input end of the signal processing circuit is connected to a touch scan terminal to receive the touch scan signal.

6. The touch readout circuit according to claim 5, wherein the current mirror circuit is configured to: provide the first current signal to the second input end of the signal processing circuit through the first output end of the current mirror circuit, and provide the second current signal to the first input end of the signal processing circuit through the second output end of the current mirror circuit.

7. The touch readout circuit according to claim 5, wherein the first gating circuit comprises a first switch transistor, a gate electrode of the first switch transistor is connected to the first gating control terminal, a first electrode of the first switch transistor is connected to the first electrode of the light-emitting component, and a second electrode of the first switch transistor is connected to the second input end of the current mirror circuit.

8. The touch readout circuit according to claim 5, wherein the current mirror circuit comprises a third switch transistor and a fourth switch transistor,
    a first electrode of the third switch transistor is connected to a gate electrode of the third switch transistor and the output end of the first gating circuit respectively, and a second electrode of the third switch transistor is connected to the second input end of the signal processing circuit;
    a gate electrode of the fourth switch transistor is connected to the gate electrode of the third switch transistor, a first electrode of the fourth switch transistor is connected to the second power voltage terminal, and a second electrode of the fourth switch transistor is connected to the first input end of the signal processing circuit.

9. The touch readout circuit according to claim 1, wherein the signal processing circuit comprises: a filter sub-circuit, a compensation sub-circuit, and an acquisition sub-circuit,
    wherein the filter sub-circuit is configured to perform filter processing on the second current signal to generate the third current signal, and provide the third current signal to the compensation sub-circuit;
    the compensation sub-circuit is configured to convert the third current signal into a first voltage signal and provide the first voltage signal to the acquisition sub-circuit; and
    the acquisition sub-circuit is configured to: convert a superimposed signal of the touch scan signal and the first current signal into a second voltage signal, generate the touch readout signal according to the second voltage signal and the first voltage signal, and provide the touch readout signal to the output end of the touch readout circuit.

10. The touch readout circuit according to claim 9, wherein the filter sub-circuit is connected to a second output end of the current mirror circuit and an input end of the compensation sub-circuit, an output end of the compensation sub-circuit is connected to a first input end of the acquisition sub-circuit, a second input end of the acquisition sub-circuit is connected to a first output end of the current mirror circuit, a third input end of the acquisition sub-circuit is connected to the touch scan terminal, and an output end of the acquisition sub-circuit is connected to the output end of the touch readout circuit.

11. The touch readout circuit according to claim 10, wherein the filter sub-circuit comprises a first capacitor, a first end of the first capacitor is connected to the second output end of the current mirror circuit and the input end of the compensation sub-circuit, and a second end of the first capacitor is grounded.

12. The touch readout circuit according to claim 10, wherein the compensation sub-circuit comprises; a first amplifier and a second capacitor,
an inverting input end of the first amplifier is connected to the input end of the compensation sub-circuit, a non-inverting input end of the first amplifier is grounded, an output end of the first amplifier is connected to the first input end of the acquisition sub-circuit; and
the second capacitor is connected between the inverting input end of the first amplifier and the output end of the first amplifier.

13. The touch readout circuit according to claim 10, wherein the acquisition sub-circuit comprises a second amplifier, a third capacitor and an adder,
a non-inverting input end of the second amplifier is connected to an output end of the adder, an inverting input end of the second amplifier is connected to the first output end of the current mirror circuit, and an output end of the second amplifier is connected to the output end of the touch readout circuit;
the third capacitor is connected between the inverting input end of the second amplifier and the output end of the second amplifier;
a first input end of the adder is connected to the output end of the compensation sub-circuit, a second input end of the adder is connected to a touch scan terminal, and the adder is configured to provide a signal obtained by superimposing the first voltage signal and the touch scan signal to the non-inverting input end of the second amplifier.

14. A touch display panel, comprising a light-emitting component and the touch readout circuit according to claim 1,
wherein a first electrode of the light-emitting component is connected to the touch readout circuit.

15. The touch display panel according to claim 14, wherein the first electrode of the light-emitting component is multiplexed as a touch electrode.

16. The touch display panel according to claim 15, further comprising a drive circuit,
wherein the drive circuit is configured to drive the light-emitting component to emit light.

17. The touch display panel according to claim 15, wherein the drive circuit comprises a data writing transistor, a driving transistor, a light-emitting control transistor and a storage capacitor,
the driving transistor is configured to drive the light-emitting component to emit light;
the data writing transistor is configured to write a data voltage to a gate electrode of the driving transistor when the data writing transistor is turned on;
the storage capacitor is configured to store the data voltage and maintain the data voltage at the gate electrode of the driving transistor; and
the light-emitting control transistor is configured to control connection or disconnection between the driving transistor and the light-emitting component.

18. A display device, comprising the touch display panel according to claim 14.

* * * * *